US009491630B2

United States Patent
Morita et al.

(10) Patent No.: US 9,491,630 B2
(45) Date of Patent: Nov. 8, 2016

(54) MOBILE COMMUNICATION SYSTEM AND MOBILE COMMUNICATION METHOD

(71) Applicant: KYOCERA CORPORATION, Kyoto (JP)

(72) Inventors: Kugo Morita, Yokohama (JP); Chiharu Yamazaki, Ota-ku (JP)

(73) Assignee: KYOCERA Corporation, Kyoto (JP)

( * ) Notice: Subject to any disclaimer, the term of this patent is extended or adjusted under 35 U.S.C. 154(b) by 52 days.

(21) Appl. No.: 14/355,669

(22) PCT Filed: Nov. 2, 2012

(86) PCT No.: PCT/JP2012/078519
§ 371 (c)(1),
(2) Date: May 1, 2014

(87) PCT Pub. No.: WO2013/065838
PCT Pub. Date: May 10, 2013

(65) Prior Publication Data
US 2014/0254541 A1  Sep. 11, 2014

Related U.S. Application Data

(60) Provisional application No. 61/555,234, filed on Nov. 3, 2011.

(51) Int. Cl.
*H04W 16/14* (2009.01)
*H04L 5/00* (2006.01)
(Continued)

(52) U.S. Cl.
CPC .......... *H04W 16/14* (2013.01); *H04J 11/0056* (2013.01); *H04L 5/0032* (2013.01);
(Continued)

(58) Field of Classification Search
CPC ............. H04W 16/18; H04W 84/045; H04W 72/082; H04W 72/0426; H04W 36/20; H04W 88/08; H04W 88/02; H04W 16/08; H04W 72/1278; H04W 72/1263; H04W 92/20; H04W 72/0446; H04W 24/10; H04W 72/1215; H04W 72/1284; H04W 72/04; H04W 28/048; H04W 36/16; H04W 36/0061; H04W 36/04; H04W 16/14; H04W 16/10; H04W 16/32; H04W 36/06; H04L 5/0032; H04L 5/0035; H04L 5/0062; H04L 5/0073; H04B 17/345; H04B 17/24; H04J 11/0056
USPC ....... 370/328, 329, 280, 315, 252, 331–334; 455/67.16, 509, 436, 522, 423, 452.1, 455/7, 452.2, 422.1, 438
See application file for complete search history.

(56) References Cited

U.S. PATENT DOCUMENTS

| 8,837,269 B2 * | 9/2014 | Ancora | ................ H04J 11/0056 370/203 |
|---|---|---|---|
| 2003/0016642 A1 | 1/2003 | Nakayasu | |

(Continued)

FOREIGN PATENT DOCUMENTS

| JP | 2003-032724 A | 1/2003 |
|---|---|---|
| JP | 2010-171885 A | 8/2010 |

(Continued)

OTHER PUBLICATIONS

The extended European Search Report issued by the European Patent Office on Feb. 3, 2015, which corresponds to European Patent Application No. 12844925.3-1857 and is related to U.S. Appl. No. 14/355,669.

(Continued)

*Primary Examiner* — Edan Orgad
*Assistant Examiner* — Ivan O Latorre
(74) *Attorney, Agent, or Firm* — Studebaker & Brackett PC

(57) ABSTRACT

A mobile communication method is applied to a mobile communication system comprising a general base station that manages a general cell and a specific base station that manages a specific cell having a coverage area smaller than a coverage area of the general cell. The mobile communication method comprises: a step A of notifying, by the general base station, the specific base station of scheduling information indicating an uplink radio resource to be assigned to general mobile terminals that are mobile terminals in a connected state in the general cell, at a time interval of a predetermined time; and a step B of notifying, by the specific base station, the general base station of general mobile terminal interference information indicating interference that the specific cell receives according to the uplink signals transmitted from the general mobile terminals at the time interval of the determined time.

6 Claims, 9 Drawing Sheets

(51) Int. Cl.

| | | |
|---|---|---|
| *H04W 36/20* | (2009.01) | |
| *H04J 11/00* | (2006.01) | |
| *H04W 16/10* | (2009.01) | |
| H04W 72/12 | (2009.01) | |
| H04W 84/04 | (2009.01) | |
| H04B 17/24 | (2015.01) | |
| H04B 17/345 | (2015.01) | |
| H04W 16/32 | (2009.01) | |
| H04W 36/06 | (2009.01) | |

(52) U.S. Cl.
CPC .......... *H04L5/0035* (2013.01); *H04L 5/0073* (2013.01); *H04W 16/10* (2013.01); *H04W 36/20* (2013.01); *H04B 17/24* (2015.01); *H04B 17/345* (2015.01); *H04W 16/32* (2013.01); *H04W 36/06* (2013.01); *H04W 72/1278* (2013.01); *H04W 84/045* (2013.01)

(56) References Cited

U.S. PATENT DOCUMENTS

| | | | | |
|---|---|---|---|---|
| 2010/0260052 | A1* | 10/2010 | Cho | H04W 48/16 370/241 |
| 2011/0013600 | A1* | 1/2011 | Kim | H04L 5/0085 370/332 |
| 2011/0212731 | A1* | 9/2011 | Lee | H04W 28/26 455/450 |
| 2011/0223928 | A1* | 9/2011 | Seo | H04B 7/024 455/452.1 |
| 2011/0249642 | A1* | 10/2011 | Song | H04W 28/16 370/329 |
| 2011/0319122 | A1* | 12/2011 | Zhou | H04W 52/146 455/522 |
| 2012/0014333 | A1* | 1/2012 | Ji | H04L 5/0032 370/329 |
| 2012/0069803 | A1 | 3/2012 | Iwamura et al. | |
| 2012/0076084 | A1 | 3/2012 | Iwamura et al. | |
| 2012/0135743 | A1 | 5/2012 | Ebiko et al. | |
| 2012/0149362 | A1* | 6/2012 | Tooher | H04W 24/10 455/423 |
| 2013/0090127 | A1* | 4/2013 | Nishikawa | H04W 72/082 455/452.1 |
| 2013/0225179 | A1* | 8/2013 | Jul | H04W 16/16 455/438 |
| 2014/0079026 | A1* | 3/2014 | Dimou | H04W 36/04 370/332 |

FOREIGN PATENT DOCUMENTS

| | | |
|---|---|---|
| JP | 2011-101344 A | 5/2011 |
| WO | 2010/079824 A1 | 7/2010 |
| WO | 2010/084987 A1 | 7/2010 |
| WO | 2010/117235 A2 | 10/2010 |
| WO | 2011/021388 A1 | 2/2011 |

OTHER PUBLICATIONS

Etri; 3GPP TSG-RAN WG3 Meeting #73bis; R3-112439 "Solutions for the macro-pico interference scenario", Oct. 10-14, 2011; Zhuhai, China.
Kyocera Corp; 3GPP TSG-RAN WG3 #73bis; R3-112611 "Carrier-based HetNet ICIC"; Oct. 10-14, 2011, Zhuhai, China.
International Search Report; PCT/JP2012/078519; Dec. 4, 2012.
Ericsson, On Inter-cell Interference Coordination Schemes without/ with Traffic Load Indication, 3GPP TSG-RAN WG1 Meeting #49-bis R1-073039, Jun. 29, 2007, 2.Basic Considerations for ICIC in the Downlink and Uplink, 5.Uplink Inter-cell Interference Coordination with TLI Support.
3GPP TS 36.300 V9.4.0 (Jun. 2010); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9).

\* cited by examiner

FIG. 5
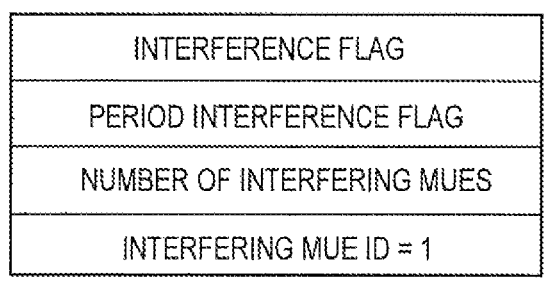
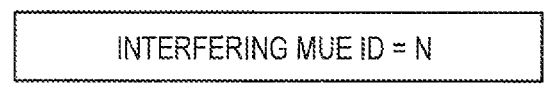

MOBILE COMMUNICATION SYSTEM AND MOBILE COMMUNICATION METHOD

TECHNICAL FIELD

The present invention relates to a mobile communication method applied to a mobile communication system in which a general cell and a specific cell are coexisting.

BACKGROUND ART

In recent years, there has been proposed a next generation mobile communication system such as LTE (Long Term Evolution).

In a mobile communication system, it is assumed that a plurality of types of cells (for example, a general cell and a specific cell) having different coverage areas are coexisting. The coverage area of the general cell is larger than a coverage area of the specific cell. The general cell is, for example, a macro cell provided by a communication provider. The specific cell is, for example, is a femto cell or a home cell provided by a third party other than the communication provider. However, the specific cell may be a CSG (Closed Subscriber Group) cell or a pico cell provided by the communication provider.

Here, the coverage area of the specific cell is considered to exist within the coverage area of the general cell. In such a case, an uplink signal transmitted from a mobile terminal (hereinafter, a general mobile terminal) that is in an idle state or a connected state in the general cell is considered to give interference to the specific cell.

However, the general cell is not able to identify the general mobile terminal that gives interference to the specific cell. Therefore, even when a signal (for example, OI: Overload Indicator) indicating that interference occurs is transmitted from the specific cell to the general cell, the general cell is not able to resolve the interference given to the specific cell.

CITATION LIST

Non-Patent Literature

Non-Patent Literature 1: 3GPP TS36. 300 V9. 4. 0

SUMMARY OF INVENTION

A mobile communication method according to a first feature is applied to a mobile communication system comprising a general base station that manages a general cell and a specific base station that manages a specific cell having a coverage area smaller than a coverage area of the general cell. The mobile communication method comprises: a step A of notifying, by the general base station, the specific base station of scheduling information indicating an uplink radio resource to be assigned to general mobile terminals that are mobile terminals in a connected state in the general cell, at time interval of a predetermined time; and a step B of notifying, by the specific base station, the general base station of general mobile terminal interference information indicating interference that the specific cell receives according to the uplink signals transmitted from the general mobile terminals at the time interval of the predetermined time.

In the first feature, the mobile communication method comprises a step C of transmitting, from the specific base station to the general base station, an interference report indicating that interference occurs in the specific cell. In the step A, the scheduling information is notified from the general base station to the specific base station in accordance with the interference report.

In the first feature, the general mobile terminal interference information includes either one of: information indicating whether the specific cell receives interference at the time interval of the predetermined time or not, the number of the general mobile terminals giving interference to the specific cell at the time interval of the predetermined time, and an identifier for identifying the general mobile terminal giving the interference to the specific cell at the time interval of the predetermined time.

In the first feature, the general mobile terminal interference information includes an identifier of the general mobile terminal giving the interference to the specific cell at the time interval of the predetermined time. The mobile communication method comprises: a step D of instructing, by the general base station, the general mobile terminal identified by the identifier included in the general mobile terminal interference information to perform handover to a frequency different from a frequency used in the specific cell.

In the first feature, the general mobile terminal interference information includes an identifier of the general mobile terminal giving the interference to the specific cell at the time interval of the predetermined time. The time interval of the predetermined time includes a plurality of unit times at which an uplink radio resource is to be assigned to the general mobile terminals. A time interval of a first predetermined time is set as the time interval of the predetermined time and a time interval of a second predetermined time is set after the time interval of the predetermined time. The mobile communication method comprises: a step E of assigning, by the general base station to the general mobile terminal identified by the identifier included in the general mobile terminal interference information corresponding to the time interval of the first predetermined time, a same uplink radio resource at the plurality of unit times included in the time interval of the second predetermined time; and a step F of instructing, by the general base station, the general mobile terminal identified by the identifier included in the general mobile terminal interference information corresponding to the time interval of the second predetermined time to perform handover to a frequency different from a frequency used in the specific cell.

BRIEF DESCRIPTION OF DRAWINGS

FIG. 5 is a diagram showing MUE interference information according to the first embodiment.

DESCRIPTION OF THE EMBODIMENT hereinafter, a mobile communication system according to an embodiment of the present invention will be described with reference to the accompanying drawings. Note that in the descriptions of the drawings below, identical or similar symbols are assigned to identical or similar portions.

However, It should be noted that the drawings are schematically shown and the ratio of each dimension and the like are different from the real ones. Accordingly, specific dimensions and the like should be determined by taking the explanation below into consideration. Of course, among the drawings, there are portions that the dimensional relationships or the ratios are different from each other.

Summary of Embodiments

A mobile communication method according to an embodiment is applied to a mobile communication system comprising a general base station that manages a general cell and a specific base station that manages a specific cell having a coverage area smaller than a coverage area of the general cell. The mobile communication method comprises: a step A of notifying, by the general base station, the specific base station of scheduling information indicating an uplink radio resource to be assigned to general mobile terminals that are mobile terminals in a connected state in the general cell, at a time interval of a predetermined time; and a step B of notifying, by the specific base station, the general base station of general mobile terminal interference information indicating interference that the specific cell receives according to uplink signals transmitted from the general mobile terminals at the time interval of the predetermined time.

In the embodiment, the specific base station is able to identify an interference source (a general mobile terminal) of interference that the specific cell receives at the time interval of the predetermined time with reference to the scheduling information received from the general base station. Further, the general base station is able to identify an interference source (a general mobile terminal) of interference that the specific cell receives at the time interval of the predetermined time according to the general mobile terminal interference information received from the specific base station.

In addition, the time interval of the predetermined time is, for example, one subframe. Alternatively, the time interval of the predetermined time may be, for example, two or more subframes.

First Embodiment

Mobile Communication System

Figure 1:
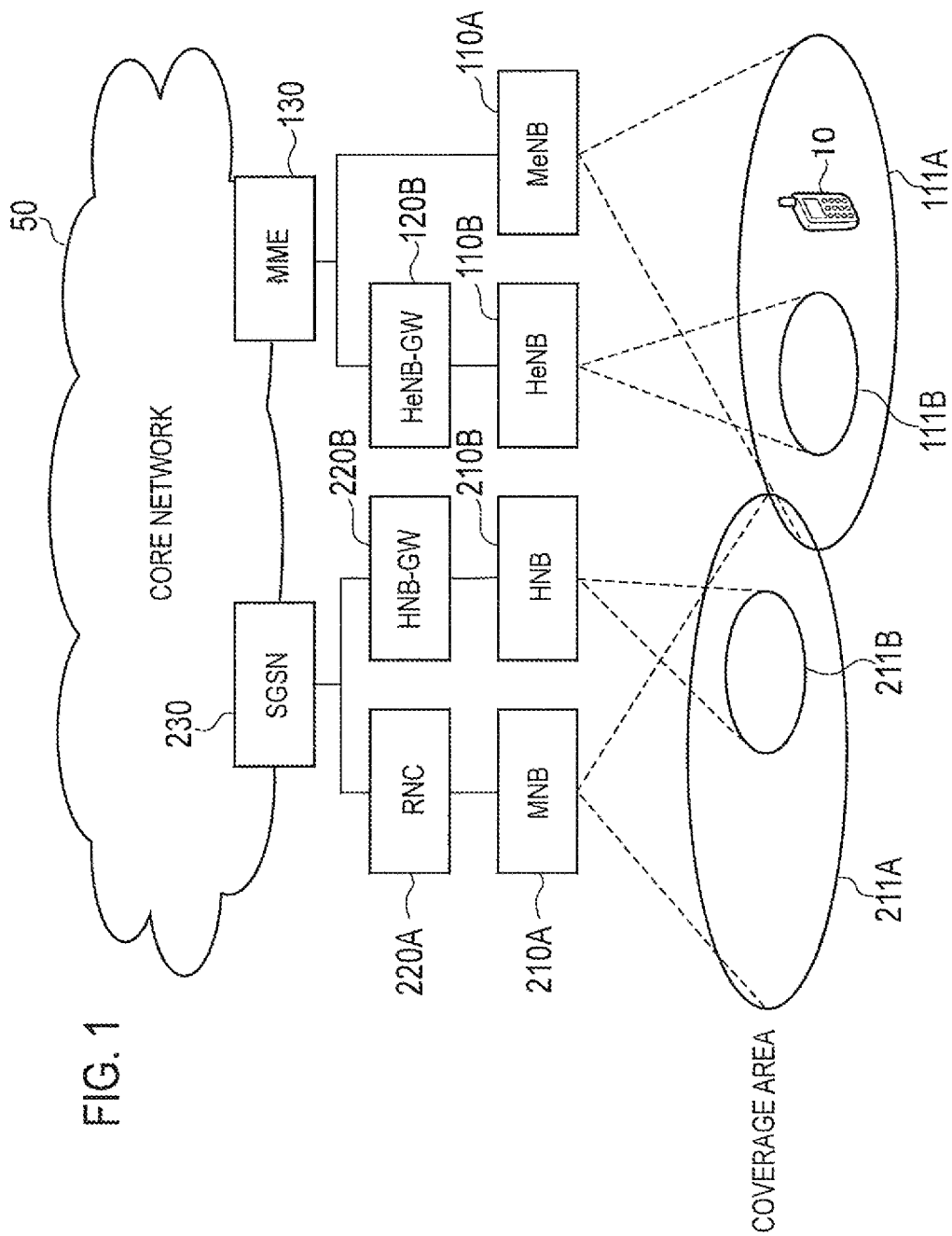
FIG. 1 is a diagram showing a mobile communication system 100 according to a first embodiment.

Hereinafter, a mobile communication system according to a first embodiment will be described. FIG. 1 is a diagram showing a mobile communication system 100 according to a first embodiment.

As shown in FIG. 1, the mobile communication system 100 comprises a radio terminal 10 (hereinafter, UE 10) and a core network 50. Further, the mobile communication system 100 comprises a first communication system and a second communication system.

The first communication system is, for example, a communication system corresponding to LTE (Long Term Evolution). The first communication system is, for example, a base station 110A (hereinafter, MeNB 110A), a home base station 110B (hereinafter, HeNB 110B), a home base station gateway 120B (hereinafter, HeNB-GW 120B), and a MME 130.

In addition, a radio access network (E-UTRAN; Evolved Universal Terrestrial Radio Access Network) corresponding to the first communication system is configured from the MeNB 110A, the HeNB 110B, and the HeNB-GW 120B.

The second communication system is, for example, a communication system corresponding to UMTS (Universal Mobile Telecommunication System). The second communication system comprises a base station 210A (hereinafter, MNB 210A), a home base station 210B (hereinafter, HNB 210B), RNC 220A, a home base station gateway 220B (hereinafter, HNB-GW 220B), and a SGSN 230.

In addition, a radio access network (UTRAN; Universal Terrestrial Radio Access Network) corresponding to the second communication system is configured from the MNB 210A, the HNB 210B, the RNC 220A, and the HNB-GW 220B.

The UE 10 is an apparatus (User Equipment) configured to communicate with the second communication system or the first communication system. For example, the UE 10 has a function of performing radio communication with the MeNB 110A and the HeNB 110B. Alternatively, the UE 10 has a function of performing radio communication with the MNB 210A and HNB 210B.

The MeNB 110A manages a general cell 111A and is an apparatus (evolved NodeB) that performs radio communication with the UE 10 that is present in the general cell 111A.

The HeNB 110A manages a specific cell 111B and is an apparatus (Home evolved NodeB) that performs radio communication with the UE 10 that is present in the specific cell 111B.

The HeNB-GW 120B is connected to the HeNB 110B and is an apparatus (Home evolved NodeB Gateway) that manages the HeNB 110B.

The MME 130 is connected to the MeNB 110A and is an apparatus (Mobility Management Entity) that manages the mobility of the UE 10 having set up a radio connection with the MeNB 110A. Further, The MME 130 is connected to the HeNB 110B through the HeNB-GW 120B and is an apparatus that manages the mobility of the UE 10 having set up a radio connection with the HeNB 110B.

The MNB 210A manages a general cell 211A and is an apparatus (NodeB) that performs radio communication with the UE 10 that is present in the general cell 211A.

The HNB 210B manages a specific cell 211B and is an apparatus (Home NodeB) that performs radio communication with the UE 10 that is present in the specific cell 211B.

The RNC 220A is connected to the MNB 210A and is an apparatus (Radio Network Controller) that sets up a radio connection (RRC Connection) with the UE 10 that is present in the general cell 211A.

The HNB-GW 220B is connected to the HNB 210B and is an apparatus (Home NodeB Gateway) that sets up a radio connection (RRC Connection) with the UE 10 that is present in the specific cell 211B.

The SGSN 230 is an apparatus (Serving GPRS Support Node) that performs packet switching in a packet switching domain. The SGSN 230 is provided in the core network 50. Although not shown in FIG. 1, an apparatus (MSC; Mobile Switching Center) that performs circuit switching in a circuit switching domain may be provided in the core network 50.

In addition, the general cell and the specific cell must be understood as functions of performing radio communication with the UE 10. However, the general cell and the specific cell are also used as terms indicating coverage areas of cells. Also, cells such as the general cell and the specific cell are identified according to the frequency used in the cell, the spreading code, the time slot, or the like.

Here, a coverage area of the general cell is larger than a coverage area of the specific cell. The general cell is, for example, a macro cell provided by a communication provider. The specific cell is, for example, a femto cell or a home cell provided by a third party other than the communication provider. The specific cell may include a CSG (Closed Subscriber Group) cell or a pico cell provided by the communication provider.

Hereinafter, the first communication system will be mainly described. However, the following descriptions may be also applied to the second communication system.

Here, in the first communication system, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme.

Further, in the first communication system, an uplink control channel (PUCCH; Physical Uplink Control Channel), an uplink shared channel (PUSCH; Physical Uplink Shared Channel), and the like exist as an uplink channel. Further, a downlink control channel (PDCCH; Physical Downlink Control Channel), a downlink shared channel (PDSCH; Physical Downlink Shared Channel), and the like exist as a downlink channel.

The uplink control channel is a channel used to transfer a control signal. The control signal is, for example, CQI (Channel Quality Indicator), PMI (Precoding Matrix Indicator), RI (Rank Indicator), SR (Scheduling Request), and ACK/NACK.

The CQI is a signal for notifying a recommended modulation method and an encoding rate to be used in downlink transmission. The PMI is a signal indicating a precoder matrix which is preferably used in downlink transmission. The RI is a signal indicating the number of layers (the number of streams) to be used in downlink transmission. The SR is a signal for requesting the assignment of an uplink radio resource (a resource block which will be described later). The ACK/NACK is a signal indicating whether a signal transmitted through the downlink channel (for example, the PDSCH) has been received or not.

The uplink shared channel is a channel used to transfer a control signal (including the above-mentioned control signal) and/or a data signal. For example, the uplink radio resource may be assigned only to the data signal, or assigned such that the data signal and the control signal are multiplexed.

The downlink control channel is a channel used to transfer a control signal. The control signal is, for example, Uplink SI (Scheduling Information), Downlink SI (Scheduling Information), and a TPC bit.

The Uplink SI is a signal indicating the assignment of the uplink radio resource. The Downlink SI is a signal indicating the assignment of a downlink radio resource. The TPC bit is a signal for instructing increase or decrease of the power of a signal transmitted through the uplink channel.

The downlink shared channel is a channel used to transfer a control signal and/or a data signal. For example, the downlink radio resource may be assigned only to the data signal, or assigned such that the data signal and the control signal are multiplexed.

In addition, TA (Timing Advance) is exemplified as a control signal transmitted through the downlink shared channel. The TA is transmission timing correction information between the UE 10 and the MeNB 110A and is measured by the MeNB 110A based on an uplink signal transmitted from the UE 10.

Furthermore, ACK/NACK is exemplified as a control signal transmitted through a channel other than the downlink control channel (the PDCCH) and the downlink shared channel (the PDSCH). The ACK/NACK is a signal indicating whether a signal transmitted through the uplink channel (for example, the PUSCH) has been received or not.

In addition, the general cell and the specific cell broadcast broadcast information through a broadcast channel (BCCH; Broadcast Control Channel). The broadcast information is, for example, information such as MIB (Master Information Block) or SIB (System Information Block).

(Radio Frame)

Figure 2:
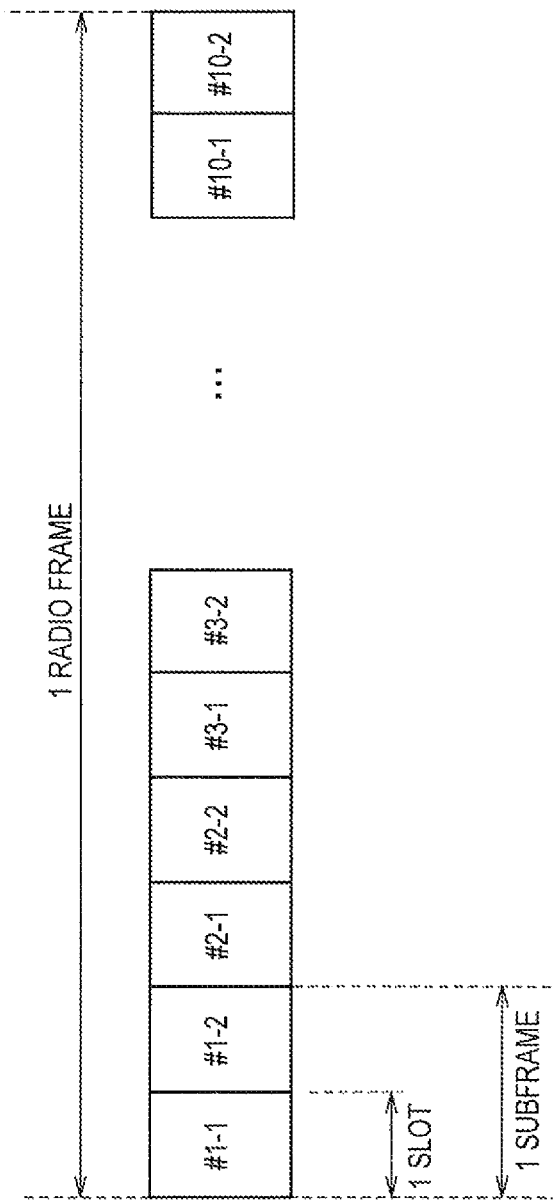
FIG. 2 is a diagram showing a radio frame according to the first embodiment.

Hereinafter, a radio frame in the first communication system will be described. FIG. 2 is a diagram showing the radio frame in the first communication system.

As shown in FIG. 2, one radio frame is configured by 10 subframes and one subframe is configured by two slots. One slot has a time length of 0.5 msec, one subframe has a time length of 1 msec, and one radio frame has a time length of 10 msec.

In addition, one slot is configured by a plurality of OFDM symbols (for example, six OFDM symbols or seven OFDM symbols) in the downward direction. Similarly, one slot is configured by a plurality of SC-FDMA symbols (for example, six SC-FDMC symbols or seven SC-FDMA symbols) in the upward direction.

(Radio Resource)

Figure 3:
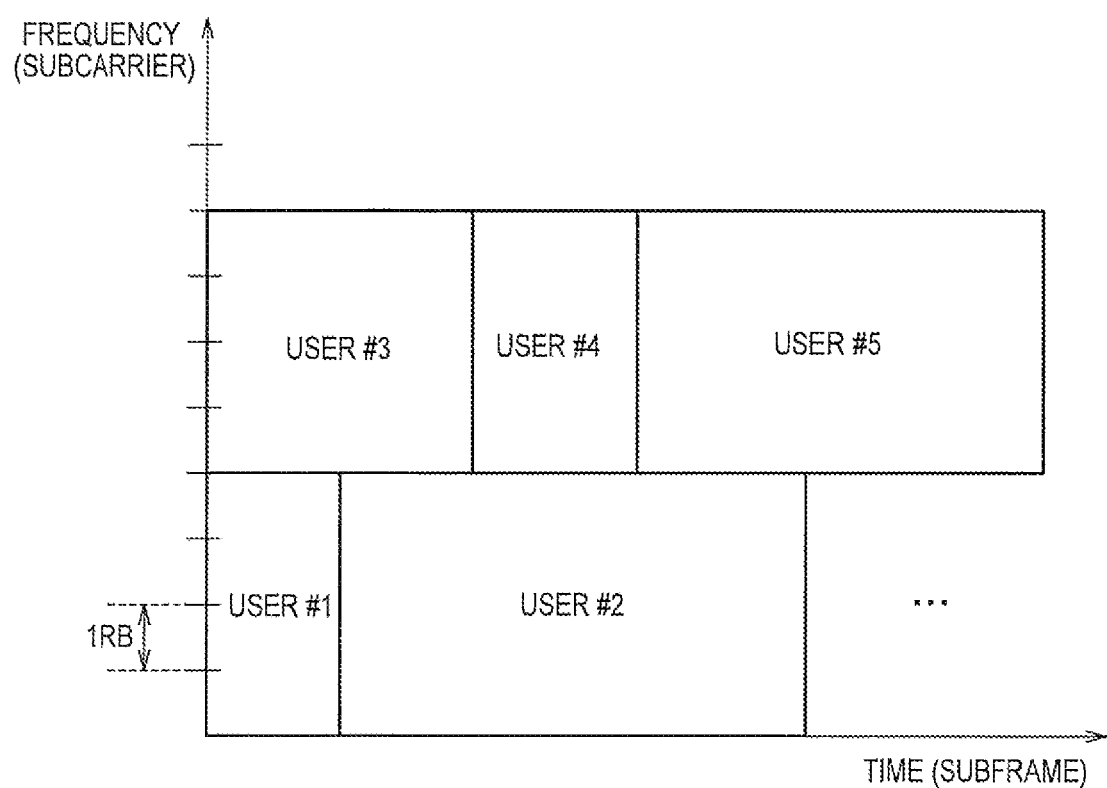
FIG. 3 is a diagram showing a radio resource according to the first embodiment.

Hereinafter, a radio resource in the first communication system will be described. FIG. 3 is a diagram showing the radio resource in the first communication system.

As shown FIG. 3, a radio resource is defined by a frequency axis and a time axis. A frequency is configured by a plurality of subcarriers, and a predetermined number of subcarriers (12 subcarriers) are collectively called a resource block (RB). A time has a unit such as the OFDM symbol (or the SC-FDMA symbol), the slot, the subframe, or the radio frame, as described above.

Here, a radio resource is assignable to each one resource block. Further, on the frequency axis and the time axis, it is possible to divide the radio resource to assign the same to a plurality of users (for example, user #1 to user #5).

Further, the radio resource is assigned by the MeNB 110A. The MeNB 110A assigns the radio resource to each UE 10 based on the CQI, the PMI, the RI, and the like.

(Application Scene)

Figure 4:
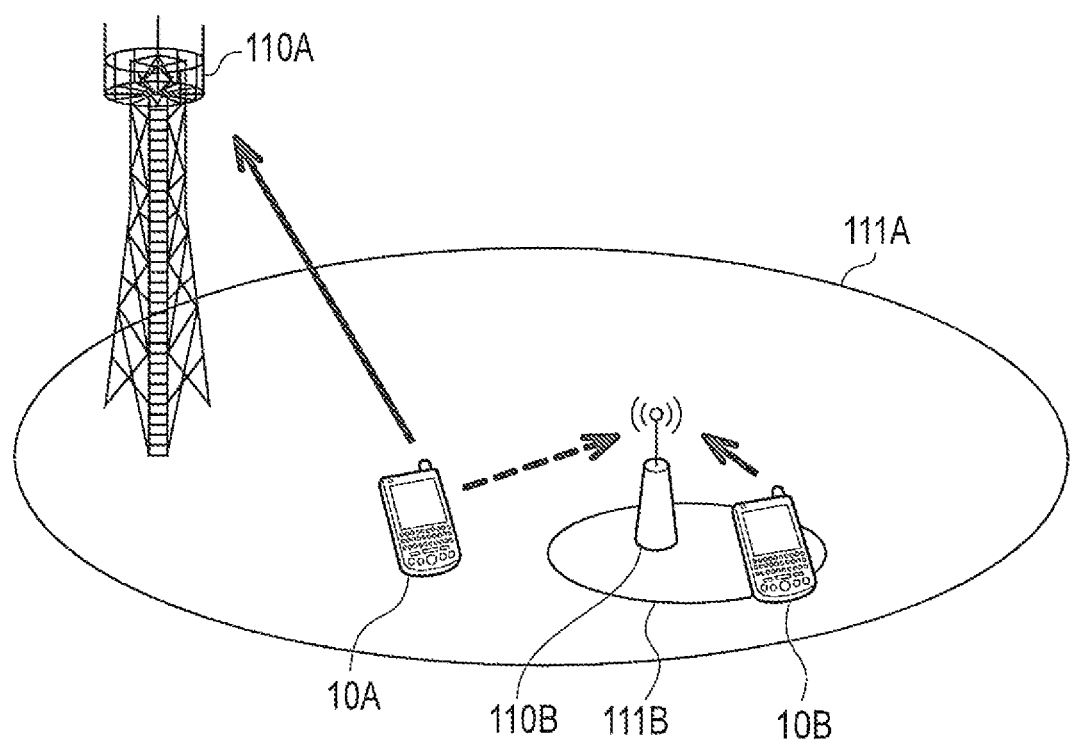
FIG. 4 is a diagram showing an application case according to the first embodiment.

Hereinafter, an application scene according to the first embodiment will be described. FIG. 4 is a diagram for explaining the application scene according to the first embodiment. Here, the MeNB 110A is exemplified as the general base station that manages the general cell, and the HeNB 110B is exemplified as the specific base station that manages the specific cell.

Further, the MUE 10A is exemplified as the UE10 (hereinafter, MUE) in a connected state in the general cell 111A. The HUE 10B is exemplified as the UE 10 (hereinafter, HUE) in a connected state in the specific cell 111B.

As shown in FIG. 4, an uplink signal transmitted from the MUE 10A to the MeNB 110A interferes with an uplink signal transmitted from the HUE 10B to the MeNB 110A according to the position of the MUE 10A.

Since the MUE 10A is in a connected state in the general cell 111A, the HeNB 110B is not able to identify the MUE 10A that gives interference to the specific cell 111B. Further, since the MUE 10A that gives interference to the special cell 111B is not able to receive a downlink signal from the specific cell 111B, the MUE 10A does not know that the MUE 10A itself gives interference to an uplink signal of the specific cell 111B. Therefore, in the conventional procedure, the MeNB 110A is not able to identify the MUE 10A that gives interference to the specific cell 111B.

However, in the conventional procedure, the HeNB 110B can transmit, to the MeNB 110A, an interference report (OI: Overload Indicator) indicating that interference occurs in the specific cell 111B. For example, the interference report indicates whether interference occurs in each resource block or not. Alternatively, the interference report indicates the level of interference occurring in each resource block.

On the other hand, in the first embodiment, the MeNB 110A notifies the HeNB 110B of scheduling information indicating an uplink radio resource that is assigned to MUE (for example, the MUE 10A) at a time interval of a time T.

The scheduling information includes an uplink radio resource that is assigned to each resource block at the time interval of the time T.

The HeNB 110B notifies the MeNB 110A of general mobile terminal interference information (hereinafter, MUE interference information) indicating that the specific cell 111B receives according to an uplink signal transmitted from the MUE (for example, the MUE 10A) at the time interval of the time T.

The MUE interference information includes, for example, as shown in FIG. 5, an interference flag, a period interference flag, the number of interfering MUEs, and interfering MUE ID.

The interference flag (Interference Flag) indicates whether the specific cell 111B receives interference at the time interval of the time T or not. The interference flag indicates that the specific cell 111B receives interference when ON is set, and indicates that the specific cell 111B does not receive interference when OFF is set.

The period interference flag (Other Interference Flag) indicates whether the specific cell 111B receives interference during the period from the transmission of a previous message (an interference report or MUE interference information) to the time interval of the time T. The period interference flag indicates that the specific cell 111B receives interference when ON is set, and indicates the specific cell 111B does not receive interference when OFF is set.

The number of interfering MUEs is the number of MUEs (hereinafter, interfering MUEs) that gives interference to the specific cell 111B at the time interval of the time T.

The interfering MUE ID is an identifier for identifying interfering MUE that gives interference to the specific cell 111B at the time interval of the time T.

The interfering MUE is MUE, to which an uplink radio resource is assigned at the time interval of the time T, when the specific cell 111B receives interference at the time interval of the time T. The HeNB 110B is able to identify the interfering MUE with reference to the scheduling information receiving from the MeNB 110A.

Specifically, the HeNB 110B is able to determine whether interference occurs in each resource block or not. Accordingly, the HeNB 110B identifies MUE to which an interfered resource block is assigned, as interfering MUE, with reference to the scheduling information.

(General Base Station)

Figure 6:
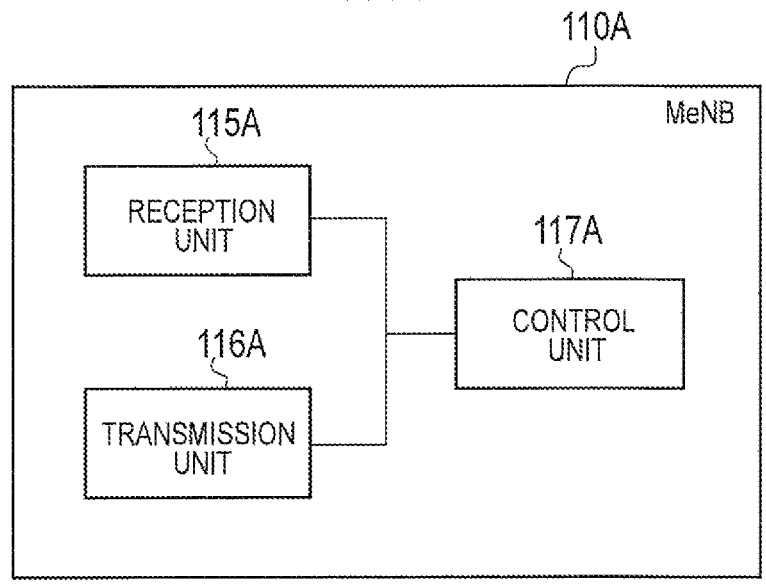
FIG. 6 is a block diagram showing MeNB 110A according to the first embodiment.

Hereinafter, the general base station according to the first embodiment will be described. FIG. 6 is a block diagram showing the general base station (here, the MeNB 110A) according to the first embodiment.

As shown in FIG. 6, the MeNB 110A comprises a reception unit 115A, a transmission unit 116A, and a control unit 117A.

The reception unit 115A receives an uplink signal from the UE 10 (for example, the MUE). The reception unit 115A receives the message (for example, the interference report or the MUE interference information) from the HeNB 110B through a back haul network. The interference report indicates that interference occurs in the specific cell 111B as described above. The MUE interference information indicates interference that the specific cell 111B receives according to the uplink signal transmitted from the MUE 10A at the time interval of the time T as described above.

The transmission unit 116A transmits a downlink signal to the UE 10 (for example, the MUE). The transmission unit 116A transmits the message (for example, the scheduling information) to the HeNB 110B through the back haul network. The scheduling information indicates the uplink radio resource that is assigned to the MUE at the time interval of the time T as described above.

The control unit 117A controls the operation of the MeNB 110A. For example, the control unit 117A assigns a radio resource to the MUE. The control unit 117A instructs interfering MUE identified by an identifier included in the MUE interference information to perform handover to a frequency that is different from a frequency used in the specific cell 111B. Specifically, the control unit 117A controls the operation of the MeNB 11A shown in FIG. 8 and FIG. 10.

(Specific Base Station)

Figure 7:
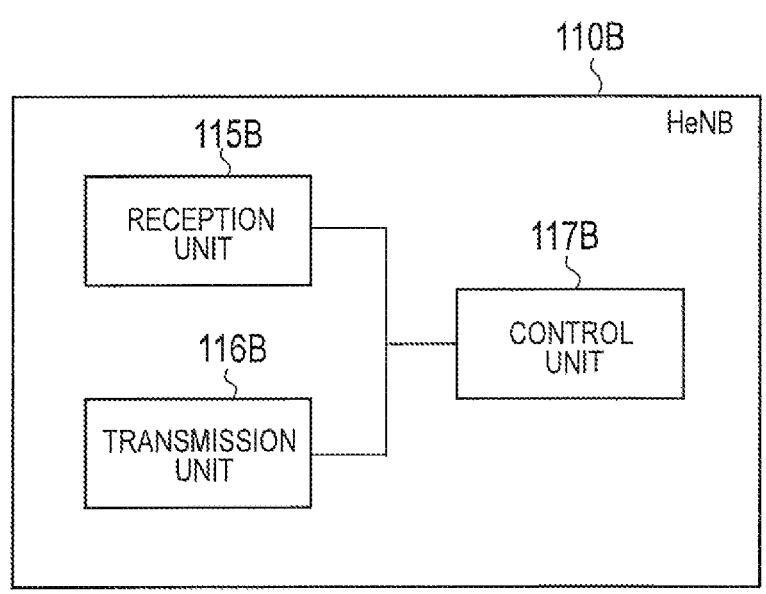
FIG. 7 is a block diagram showing HeNB 110B according to the first embodiment.

Hereinafter, the specific base station according to the first embodiment will be described. FIG. 7 is a block diagram showing the specific base station (here, the HeNB 110B) according to the first embodiment.

As shown in FIG. 7, the HeNB 110B comprises a reception unit 115B, a transmission unit 116B, and a control unit 117B.

The reception unit 115B receives an uplink signal from the UE 10 (for example, the HUE). The reception unit 115B receives a message (for example, scheduling information) from the MeNB 110A through the back haul network.

The transmission unit 116B transmits a downlink signal to the UE 10 (for example, the HUE). The transmission unit 116B transmits the message (for example, the interference report or the MUE interference information) to the MeNB 110A through the back haul network.

The control unit 117B controls the HeNB 110B. For example, the control unit 117B assigns a radio resource to the HUE. Specifically, the control unit 117B controls the operation of the HeNB 110B shown in FIG. 8 and FIG. 9.

(Operation of Mobile Communication System)

Figure 8:
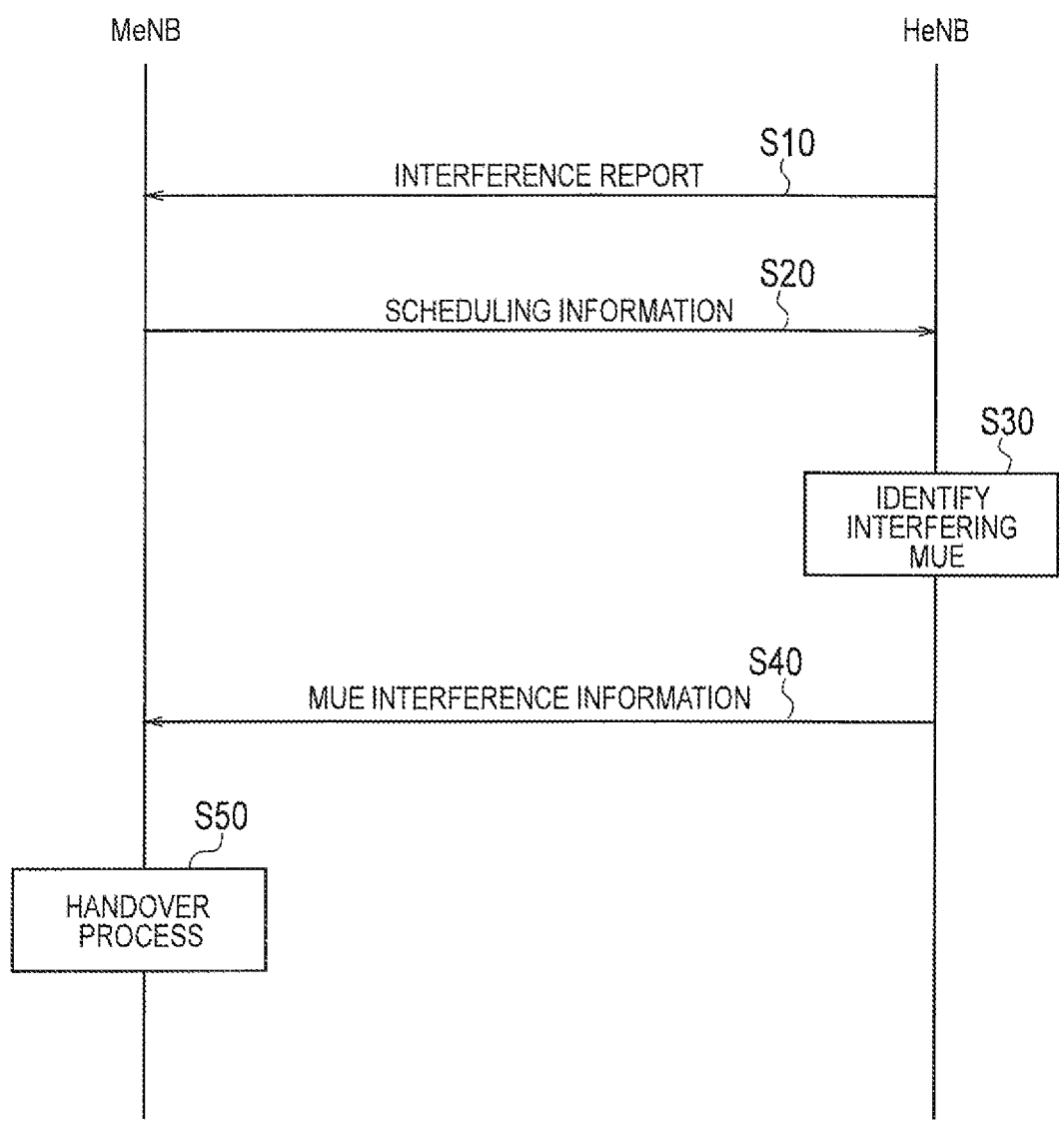
FIG. 8 is a sequence diagram showing an operation of the mobile communication system 100 according to the first embodiment.

Hereinafter, the operation of the mobile communication system according to the first embodiment will be described. FIG. 8 is a sequence diagram shown an operation of the mobile communication system 100 according to the first embodiment.

As shown in FIG. 8, in step 10, the HeNB 110B transmits (notifies), to the MeNB 110A, an interference report indicating that interference occurs in the specific cell 111B.

In step 20, the MeNB 110A transmits (notifies), to the HeNB 110B, scheduling information that indicates an uplink radio resource assigned to the MUE at the time interval of the time T.

In step 30, the HeNB 110B identifies interfering MUE that gives interference to the specific cell 111B at the time interval of the time T (an interfering MUE identification process). Details of the interfering MUE identification process will be described later (refer to FIG. 9).

In step 40, the HeNB 110B transmits (notifies), to the MeNB 110A, MUE interference information that indicates interference the specific cell 111B receives according to an uplink signal transmitted from the MUE at the time interval of the time T.

In step 50, the MeNB 110A instructs interfering MUE identified by an identifier included in the MUE interference information to perform handover to a frequency that is different from a frequency used in the specific cell 111B (a handover process). Details of the handover process will be described later (refer to FIG. 10).

(Operation of Specific Base Station)

Figure 9:
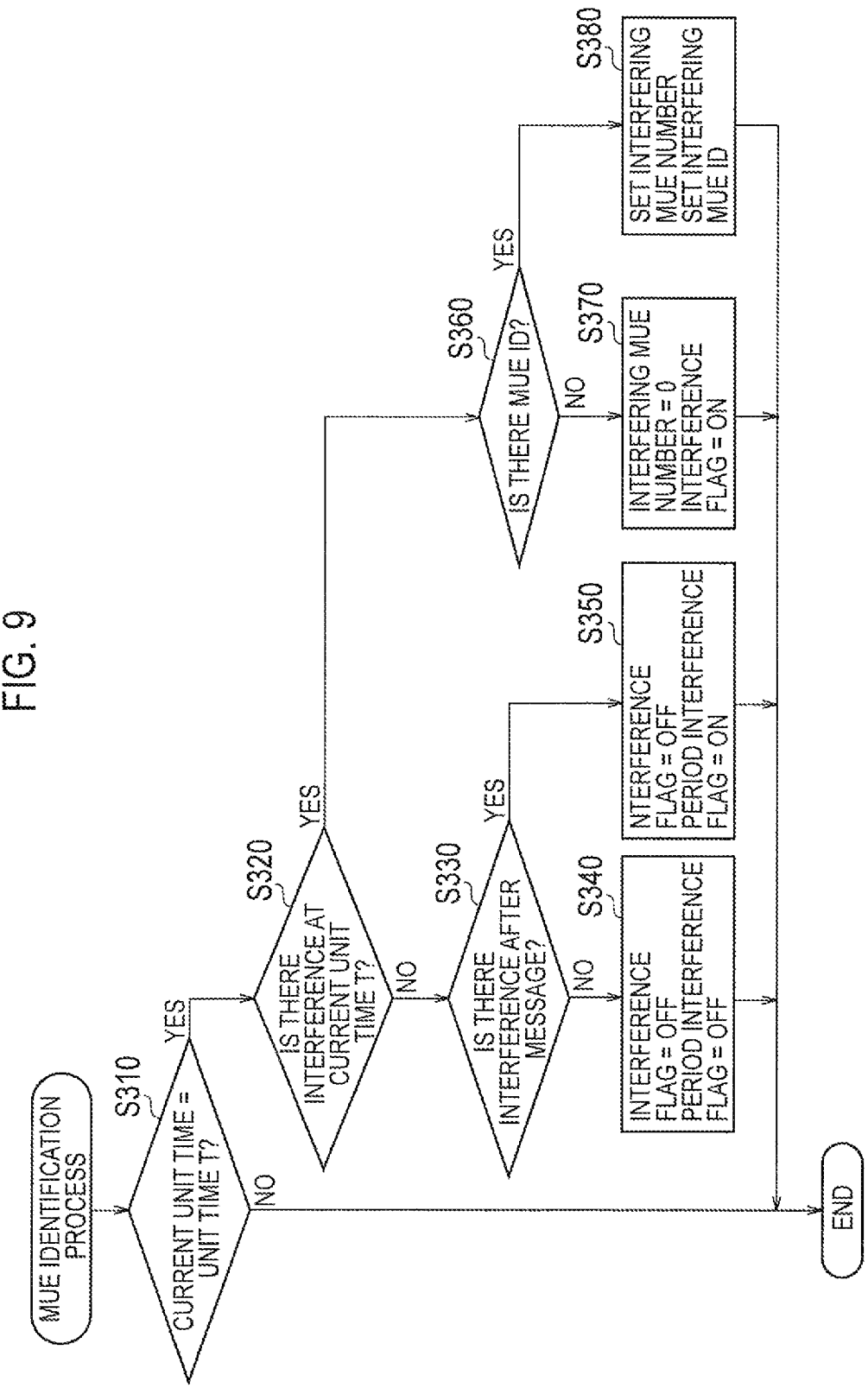
FIG. 9 is a flow diagram showing an operation of the HeNB 110B according to the first embodiment.

Hereinafter, the operation of the specific base station according to the first embodiment will be described. FIG. 9 is a flow chart showing the operation (the interfering MUE identification process) of the HeNB 110B according to the first embodiment.

As shown in FIG. 9, in step 310, the HeNB 110B determines whether a current unit time is the time interval of the time T or not. When a result of the determination is "YES", the HeNB 110B proceeds to a process in step 320. When the result of the determination is "NO", the HeNB 110B ends the interfering MUE identification process.

In step 320, the HeNB 110B determines whether interference occurs at the time interval of the time T or not. Specifically, the HeNB 110B determines whether the interference exceeds a predetermined threshold value at the time interval of the time T or not. When a result of the determination is "YES", the HeNB 110B proceeds to a process in step 360. When the result of the determination is "NO", the HeNB 110B proceeds to a process in step 330.

In step 330, the HeNB 110B determines whether interference occurred after the transmission of a previous message (for example, an interference report or MUE interference information) or not. Specifically, the HeNB 110B determines whether the interference exceeded the predetermined threshold value after the transmission of the previous message or not. When a result of the determination is "YES", the HeNB 110B proceeds to a process in step 350. When the result of the determination is "NO", the HeNB 110B proceeds to a process in step 340.

In step 340, the HeNB 110B sets the interference flag to OFF and sets the period interference flag to OFF.

In step 350, the HeNB 110B sets the interference flag to OFF and sets the period interference flag to ON.

In step 360, the HeNB 110B determines whether an identifier for identifying MUE is included in scheduling information or not. When a result of the determination is "YES", the HeNB 110B proceeds to a process in step 380. When the result of the determination is "NO", the HeNB 110B proceeds to a process in step 370.

In step 370, the HeNB 110B sets the number of interfering MUEs to 0 and sets the interference flag to ON.

In step 380, the HeNB 110B sets the number of interfering MUEs to MUEs included in the scheduling information, and set the interfering MUE ID to the identifier for identifying the MUEs included in the scheduling information.

Specifically, the HeNB 110B sets the interfering MUE ID to the identifier for identifying MUE to which a resource block that interference occurs is assigned with reference to the scheduling information.

Thereby, the MUE interference information is generated in the step 340, the step 350, the step 370, or the step 380.

(Operation of General Base Station)

Figure 10:
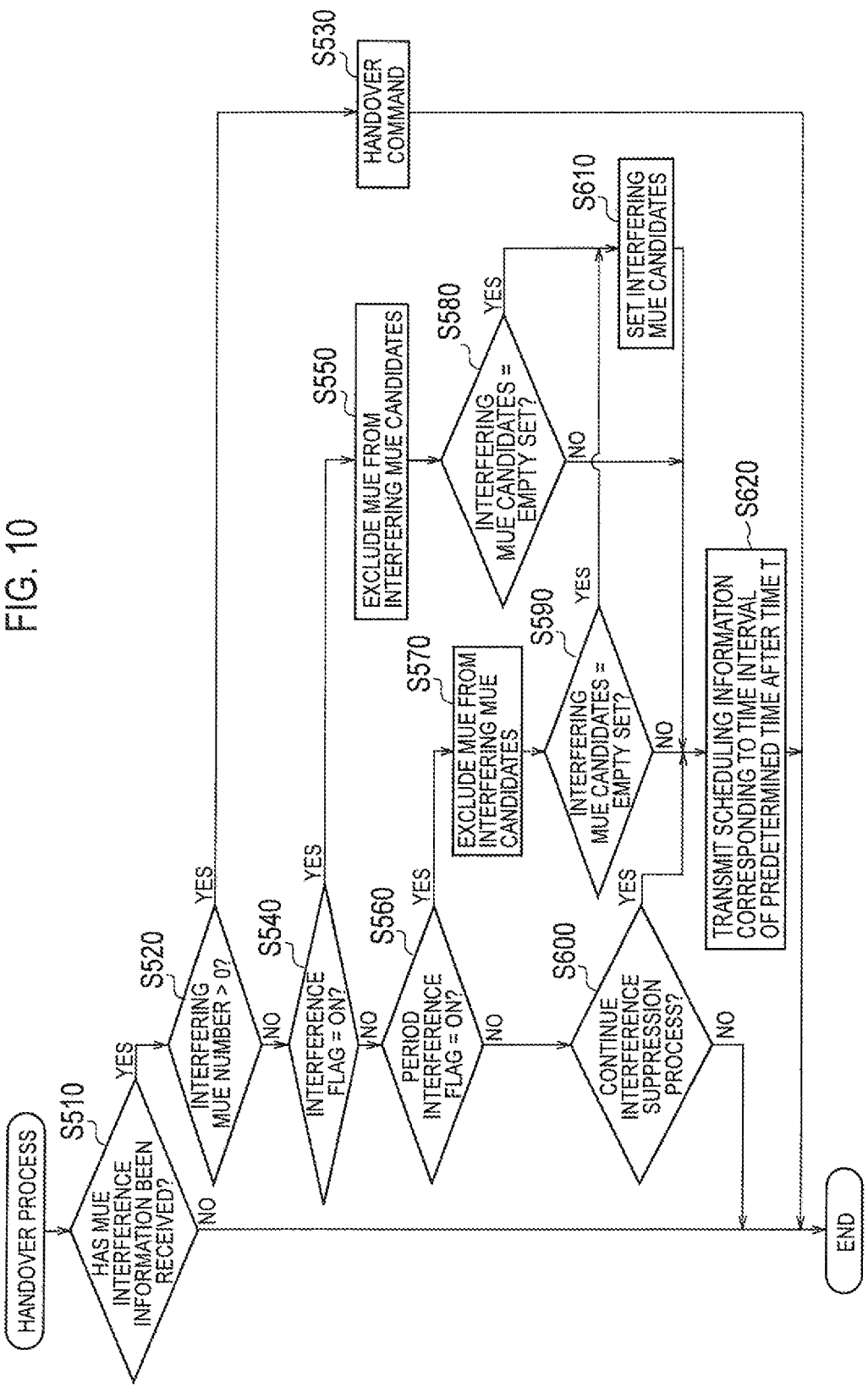
FIG. 10 is a flow diagram showing an operation of the MeNB 110A according to the first embodiment.

Hereinafter, the operation of the general base station according to the first embodiment will be described. FIG. 10 is a flow chart showing the operation (the handover process) of the MeNB 110A according to the first embodiment.

As shown in FIG. 10, in step 510, the MeNB 110A determines whether the MUE interference information was received or not. When a result of the determination is "YES", the MeNB 110A proceeds to a process in step 520. When the result of the determination is "NO", the MeNB 110A ends the handover process.

In step 520, the MeNB 110A determines whether the number of interfering MUE included in the MUE interference information is equal to or more than 1. When a result of the determination is "YES", the MeNB 110A proceeds to a process in step 530. When the result of the determination is "NO", the MeNB 110A proceeds to a process in step 540.

In step 530, the MeNB 110A instructs interfering MUE identified according to interfering MUE ID included in the MUE interference information to perform handover to a frequency that is different from a frequency used in the specific cell 111B.

In step 540, the MeNB 110A determines whether the interference flag included in the MUE interference information is set to ON or not. When a result of the determination is "YES", the MeNB 110A proceeds to a process in step 550. When the result of the determination is "NO", the MeNB 110A proceeds to a process in step 560.

In step 550, the MeNB 110A excludes MUE that actually transmits an uplink signal among MUEs included in scheduling information corresponding to the time interval of the time T from interfering MUE candidates. In other words, the MeNB 110A determines that the MUE that actually transmitted the uplink signal is not an interference source among the MUEs included in the scheduling information.

In addition, as an initial value of the interfering MUE candidates, all UEs 10 (MUEs) in a connected state in the general cell 111A are set.

In step 560, the MeNB 110A determines whether the period interference flag included in the MUE interference information is set to ON or not. When a result of the determination is "YES", the MeNB 110A proceeds to a process in step 570. When the result of the determination is "NO", the MeNB 110A proceeds to a process in step 600.

In step 570, the MeNB 110A excludes MUE that actually transmits an uplink signal among MUEs that an uplink radio resource is assigned to at the time interval of the time T, from interfering MUE candidates. In other words, the MeNB 110A determines that the MUE that actually transmitted the uplink signal is not an interference source among the MUEs that an uplink radio resource is assigned to at the time interval of the time T.

In step 580, the MeNB 110A determines whether the interfering MUE candidates are an empty set or not. When a result of the determination is "YES", the MeNB 110A proceeds to a process in step 610. When the result of the determination is "NO", the MeNB 110A proceeds to a process in step 620.

In step 590, the MeNB 110A determines whether the interfering MUE candidates are an empty set or not. When a result of the determination is "YES", the MeNB 110A proceeds to a process in step 610. When the result of the determination is "NO", the MeNB 110A proceeds to a process in step 620.

In step 600, the MeNB 110A determines whether a process (an interference suppression process) for suppressing interference occurring in the specific cell 111B is continued or not. When a result of the determination is "YES", the MeNB 110A proceeds to a process in step 620. When the result of the determination is "NO", the MeNB 110A ends the handover process.

In step 610, the MeNB 110A sets the interfering MUE candidates again. In other words, the MeNB 110A sets MUEs (the interfering MUE candidates), which are to be included in the scheduling information, again.

For example, the MeNB 110A sets all UEs 10 (MUEs) in connected state in the general cell 111A as the interfering MUE candidates.

In step 620, the MeNB 110A transmits scheduling information corresponding to a time interval of the predetermined time after the time interval of the time T.

(Operation and Effect)

In the embodiment, the HeNB 110B is able to identify an interference source (MUE) of interference that the specific cell 111B receives at the time interval of the predetermined time with reference to the scheduling information received from the MeNB 110A. Further, the MeNB 110A is able to identify an interference source (MUE) of interference that gives interference to the specific cell 111B at the time interval of the predetermined time according to the MUE interference information received from the HeNB 110B.

[First Modification]

Hereinafter, a first modification of the first embodiment will be described. As below, the differences from the first embodiment will be described mainly.

In the first modification, the MUE interference information includes an identifier (interfering MUE ID) of MUE that gives interference to the specific cell 111B at the time interval of the predetermined time. Further, the time interval of the predetermined time includes a plurality of unit times (here, subframes) at which an uplink radio resource is to be assigned to the MUE. As the time interval of the predetermined time, the time interval of the time T is set and a time interval of the predetermined time after the time interval of the time T is set.

Based on the assumption, the MeNB 110A assigns the same uplink radio resource to MUE, which is identified by the interfering MUE ID included in the MUE interference information corresponding to the time interval of the time T, at the plurality of unit times included in the time interval of the predetermined time after the time interval of the time T.

The MeNB 110A instructs the MUE, which is identified by the identifier included in the MUE interference information corresponding to the time interval of the predetermined time after the time interval of the time T, to perform handover to a frequency that is different from a frequency used in the specific cell 111B.

The first modification assumes a case where the uplink radio resource is assigned to different MUEs at each of the plurality of unit times included in the time interval of the time T and which MUE is giving interference to the specific cell 111B among the plurality of MUEs identified by the interfering MUE ID included in the MUE interference information is not clear.

In this case, it is possible to reliably identify the MUEs giving interference to the specific cell 111B by assigning the same uplink radio resource to the MUE identified by the interfering MUE ID included in the MUE interference information corresponding to the time interval of the time T at the plurality of unit times included in the time interval of the predetermined time after the time interval of the time T.

Here, the reason, by which the time interval of the predetermined time includes the plurality of unit times, is as follows. Specifically, when synchronization between the MeNB 110A and the HeNB 110B is not made, an uplink signal transmitted from the MUE is highly likely to give interference to the specific cell 111B across a plurality of subframes. Therefore, it is possible to identify an interference source (MUE) of interference given to the specific cell 111B by notifying scheduling information of a plurality of continuous unit times from the MeNB 110A to the HeNB 110B. However, in such a case, since it is also assumed that the plurality of continuous unit times are assigned to MUEs that are different from each other, the same uplink radio resource is assigned at the plurality if unit times included in the time interval of the predetermined time after the time interval of the time T.

Other Embodiments

The present invention is explained as the embodiment described above, however, it must not be understood that the discussions and the drawings constituting apart of these disclosures limit the present invention. Various modifications, embodiments, and operational techniques will be apparent to those of ordinary skill in the art in viewing of these disclosures.

In the embodiment, the MeNB 110A was exemplified as the general base station that manages the general cell, and the HeNB 110B was exemplified as the specific base station that manages the specific cell. However, the general base station that manages the general cell may be the MNB 210A. Further, the specific base station that manages the specific cell may be the HNB 210B.

The embodiment was described based on the assumption that synchronization between the predetermined time (for example, a timing of a subframe) in the general cell and the predetermined time (for example, a timing of a subframe) in the specific cell is made. However, the embodiment is not limited thereto. The predetermined time in the general cell and the specific cell may be determined at an absolute time common in the general cell and the specific cell.

Note that the entire content of the U.S. Provisional Application No. 61/555,234 (filed on Nov. 3, 2011) is incorporated herein by reference.

INDUSTRIAL APPLICABILITY

According to the present invention, a general mobile terminal that gives interference to a specific cell can be identified.

The invention claimed is:

1. A mobile communication method applied to a mobile communication system comprising a general base station that manages a general cell and a specific base station that manages a specific cell, the method comprising:
   a step A of notifying, by the general base station, the specific base station of scheduling information indicating an uplink radio resource to be assigned to general mobile terminals that are mobile terminals in a connected state in the general cell, at a time interval of a predetermined time; and
   a step B of notifying, by the specific base station, the general base station of general mobile terminal interference information indicating interference that the specific cell receives according to the uplink signals transmitted from the general mobile terminals at the time interval of the predetermined time after the step A; wherein
   the general mobile terminal interference information indicates an interference received by the specific cell according to an uplink signals transmitted from the general mobile terminals at the time interval of the predetermined time, the specific cell has a coverage area smaller than a coverage area of the general cell, the general mobile terminal interference information includes an identifier of the general mobile terminal giving interference to the specific cell at the time interval of the predetermined time, the time interval of the predetermined time includes a plurality of unit times at which an uplink radio resource is to be assigned to the general mobile terminals, a time interval of a first predetermined time is set as the time interval of the predetermined time and a time interval of a second predetermined time is set after the time interval of the predetermined time, and the method comprises:

a step E of assigning, by the general base station to the general mobile terminal identified according to the identifier included in the general mobile terminal interference information corresponding to the time interval of the first predetermined time, a same uplink radio resource at the plurality of unit times included in the time interval of the second predetermined time; and a step F of instructing, by the general base station, the general mobile terminal identified according to the identifier included in the general mobile terminal interference information corresponding to the time interval of the second predetermined time to perform handover to a frequency that is different from a frequency used in the specific cell.

2. The mobile communication method according to claim 1, comprising:

a step C of transmitting, from the specific base station to the general base station, an interference report indicating that interference occurs in the specific cell, wherein in the step A, the scheduling information is notified from the general base station to the specific base station in accordance with the interference report.

3. The mobile communication method according to claim 1, wherein the general mobile terminal interference information includes either one of: information indicating whether the specific cell receives interference at the time interval of the predetermined time, the number of the general mobile terminals giving interference to the specific cell at the time interval of the predetermined time, and an identifier for identifying the general mobile terminal giving interference to the specific cell at the time interval of the predetermined time.

4. The mobile communication method according to claim 1, wherein the general mobile terminal interference information includes an identifier of the general mobile terminal giving interference to the specific cell at the time interval of the predetermined time, and the method comprises: a step D of instructing, by the general base station, the general mobile terminal identified by the identifier included in the general mobile terminal interference information to perform handover to a frequency that is different from a frequency used in the specific cell.

5. A general base station in a mobile communication system comprising the general base station that manages a general cell and a specific base station that manages a specific cell, the general base station comprising:

a control processor configured to notify the specific base station of scheduling information indicating an uplink radio resource to be assigned to general mobile terminals that are mobile terminals in a connected state in the general cell, at a time interval of a predetermined time, and to be subsequently notified, by the specific base station, of general mobile terminal interference information indicating interference that the specific cell receives according to the uplink signals transmitted from the general mobile terminals at the time interval of the predetermined time; wherein the general mobile terminal interference information indicates an interference received by the specific cell according to an uplink signals transmitted from the general mobile terminals at the time interval of the predetermined time, the specific cell has a coverage area smaller than a coverage area of the general cell, the general mobile terminal interference information includes an identifier of the general mobile terminal giving interference to the specific cell at the time interval of the predetermined time, the time interval of the predetermined time includes a plurality of unit times at which an uplink radio resource is to be assigned to the general mobile terminals, a time interval of a first predetermined time is set as the time interval of the predetermined time and a time interval of a second predetermined time is set after the time interval of the predetermined time, the general base station assigns to the general mobile terminal identified according to the identifier included in the general mobile terminal interference information corresponding to the time interval of the first predetermined time, a same uplink radio resource at the plurality of unit times included in the time interval of the second predetermined time; and the general base station instructs the general mobile terminal identified according to the identifier included in the general mobile terminal interference information corresponding to the time interval of the second predetermined time to perform handover to a frequency that is different from a frequency used in the specific cell.

6. A specific base station in a mobile communication system comprising a general base station that manages a general cell and the specific base station that manages a specific cell, the specific base station comprising:

a control processor configured to be notified, by the general base station, of scheduling information indicating an uplink radio resource to be assigned to general mobile terminals that are mobile terminals in a connected state in the general cell, at a time interval of a predetermined time, and to subsequently notify the general base station of general mobile terminal interference information indicating interference that the specific cell receives according to the uplink signals transmitted from the general mobile terminals at the time interval of the predetermined time; wherein the general mobile terminal interference information indicates an interference received by the specific cell according to an uplink signals transmitted from the general mobile terminals at the time interval of the predetermined time, the specific cell has a coverage area smaller than a coverage area of the general cell, the general mobile terminal interference information includes an identifier of the general mobile terminal giving interference to the specific cell at the time interval of the predetermined time, the time interval of the predetermined time includes a plurality of unit times at which an uplink radio resource is to be assigned to the general mobile terminals, a time interval of a first predetermined time is set as the time interval of the predetermined time and a time interval of a second predetermined time is set after the time interval of the predetermined time, the general base station assigns to the general mobile terminal identified according to the identifier included in the general mobile terminal interference information corresponding to the time interval of the first predetermined time, a same uplink radio resource at the plurality of unit times included in the time interval of the second predetermined time; and the general base station instructs the general mobile terminal identified according to the identifier included in the general mobile terminal interference information corresponding to the time interval of the second predetermined time to perform handover to a frequency that is different from a frequency used in the specific cell.

\* \* \* \* \*